United States Patent Office 3,534,017
Patented Oct. 13, 1970

3,534,017
PROCESS FOR THE PREPARATION OF NUCLE-
OSIDE-5'-DIPHOSPHATES AND TRIPHOSPHATES
AND MONO- AND OLIGO-NUCLEOTIDYL-
NUCLEOSIDE-5'-DIPHOSPHATES AND TRIPHOS-
PHATES
Yasuo Fujimoto and Masayuki Teranishi, Tokyo, Japan,
assignors to Kyowa Hakko Kogyo Kabushiki Kaisha
(Kyowa Hakko Kogyo Company Limited), Tokyo-to,
Japan, a body corporate of Japan
No Drawing. Filed Mar. 13, 1968, Ser. No. 712,588
Claims priority, application Japan, Mar. 14, 1967,
42/15,593; May 31, 1967, 42/34,216
Int. Cl. C07d 51/50
U.S. Cl. 260—211.5                                6 Claims

ABSTRACT OF THE DISCLOSURE

A process for preparing nucleoside-5'-diphosphates and triphosphates and mono- and oligo-nucleotidyl-nucleoside-5'-diphosphates and triphosphates by the reaction of a nucleoside-5'-monophosphoramide or a mono- or oligo-nucleotidyl-nucleoside-5'-monophosphoramide with ortho- or pyrophosphoric acid or an ester or salt thereof in the presence of an organic triester of phosphoric acid. The products of the process are useful in the biosynthesis of nucleic acids, as sources of energy and phosphoric acid required for enzymatic reactions in cells and as medicines.

BACKGROUND OF THE INVENTION AND DESCRIPTION OF THE PRIOR ART

Nucleoside-5'-diphosphates and triphosphates, and mono- and oligo-nucleotidyl-5'-diphosphates and triphosphates are important in the biosynthesis of nucleic acids and are also sources of energy and pohsphoric acid required for enzymatic reactions in cells. These compounds are also useful in medicine. Pyrimidine nucleoside-5'-diphosphates and triphosphates e.g. UTP, CTP and TTP, are capable of forming coenzymes which catalyze important metabolic processes. Adenosine-5'-triphosphate is of use in the treatment of heart disease, high blood pressure etc.

Among the known processes for the synthesis of purine-pyridine-, pyrimidine- or imidazole-nucleoside-5'-diphosphates and triphosphates are:

(a) A process reported by H. G. Khorana et al., in which a purine- or pyrimidine-nucleoside-5'-monophosphate is condensed with orthophosphoric acid or a salt thereof in the presence of dicyclohexylcarbodiimide (DCC) [J. Amer. Chem. Soc., 76, 3517 (1954); ibid., 76, 5056 (1954); and ibid., 80, 1141 (1958)] and (b) A process in which a purine or pyrimidine-nucleoside-5'-monophoshoroamide is reacted with ortho- or pyrophosphoric acid or a salt thereof [J. Amer. Chem. Soc., 83, 649 (1961)].

In the former process, byproducts may be formed e.g. tetraphosphates and dinucleosidepyrophosphates, in addition to the desired nucleoside-5'-diphosphates and triphosphates. A large amount of orthophosphoric acid (at least ten mols) is required for reasonable yields of the triphosphates. The yields from starting materials are low due to the difficulties in the separation and purification of the products which involves treatment with active charcoal and elution with ammoniacal ethanol to remove by products such as inorganic polyphosphates and the excess of orthophosphoric acid.

In process (b) it is difficult to improve the yields beyond a certain point since pyridine has been reported as catalyzing the decomposition of polyphosphates e.g. 5'-triphosphates give 5'-monophosphates, 5'-diphosphates and di-nucleoside-polyphosphates etc. [J. G. Moffatt and H. G. Khorana et al., J. Amer. Chem. Soc., 83 (1961), 649; ibid., 87, 2257 (1965)]. However, it has been reported that some solvents will inhibit this decomposition e.g. dimethylsulphoxide [J. Amer. Chem. Soc., 86, 1254 (1964); ibid., 87, 2257 (1965); and ibid., 87, 3760 (1965)] and yields of 81–84% of nucleoside-5'-triphosphates have been obtained from the corresponding ribo- or deoxyribonucleoside-5'-phosphoromorpholidates by reaction for 48–72 hours with tributyl ammonium pyrophosphate in dry dimethyl sulphoxide [Can. J. Chem., 42, 599 (1964)]. The disadvantages of using dimethylsulphoxide are its comparatively high melting point, necessitating an elevated reaction temperature, its unpleasant odor and skin absorption.

GENERAL DESCRIPTION OF THE INVENTION

For the purpose of overcoming these defects, we have discovered that nucleoside-5'-diphosphates and triphosphates and mono- and oligo-nucleotidyl-nucleoside-5'-diphosphates and triphosphates can be obtained with a high yield and without these defects by the process according to the present invention as hereinafter described and claimed.

An object of the present invention is therefore to provide a process for preparing nucleoside-5'-disphosphates and triphosphates with a high yield.

Another object of the present invention is to provide a process for preparing mono- and oligo-nucleotidyl-nucleoside-5'-diphosphates and triphosphates with a high yield.

Other objects and features will be apparent upon reading the undergoing specification and claims.

According to the invention, we provide a process for the preparation of nucleoside-5'-disphosphates and triphosphates and mono- and oligo-nucleotidyl-nucleoside-5'-disphosphates and triphosphates in which a nucleoside-5'-monophosphoroamide or a mono- or oligo-nucleotidyl nucleoside-5'-monophosphoroamide is reacted with ortho- or pyrophosphoric acid or an ester or salt thereof in the presence of an organic triester of phosphoric acid.

The organic triesters of phosphoric acid used in the process according to the inventon may be represented by the Formula I

in which $R_1$, $R_2$ and $R_3$, which may be the same or different, for example represent an alkyl group e.g. a lower alkyl group such as a methyl, etyhl, propyl, butyl, amyl or hexyl group, an aryl group e.g. a monocyclic aryl group such as a phenyl, o-tolyl, or m-tolyl group, an aralkyl group e.g. one in which the alkyl portion is lower alkyl and the aryl portion is monocyclic such as a benzyl group, or a cycloalkyl group e.g. a cyclopentyl or cyclohexyl group.

It is advantegous to use phosphates which are liquid at ambient temperature in order to aid the isolation procedure but it is possible if desired to use those which are only liquid at elevated temperatures.

Ortho- and pyrophosphoric acid and the esters and salts thereof useful in the process according to the invention may be represented by the Formulae II and III respectively

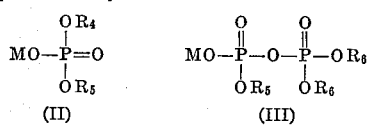

in which $R_4$, $R_5$, $R_6$ and $R_7$, which may be the same or different, for example represent hydrogen, an alkyl group e.g. a lower alkyl group such as a methyl, ethyl, propyl, butyl, amyl or hexyl group, a cycloalkyl group e.g. a cyclopentyl or cyclohexyl group, an aryl group e.g. a monocyclic aryl group such as a phenyl, o-tolyl or m-tolyl group or an aralkyl group e.g. one in which the alkyl portion is lower alkyl and the aryl portion is monocyclic such as a benzyl group, or an organic or inorganic cation radical for example an aliphatic, aromatic, cycloaliphatic or heterocyclic ammonium ion e.g. trimethylammonium, triethylammonium, tripropylammonium, tributylammonium, triamylammonium, trihexylammonium, tribenzylammonium, triphenylammonium, tricyclohexylammonium, piperidinium, cyclohexylguanidinium, and 4-morpholino-N,N'-dicyclohexyl carboxamidinium ion, or an alkali metal ion e.g. lithium, sodium, or potassium ion, and M represents hydrogen, or an inorganic or organic cation.

If desired, any of the above may be used in the process according to the invention but better results are to be obtained using organic amine salts, or phenyl or benzyl-esters which have higher solubility in organic solvents.

Nucleoside-5'-monophosphoroamides and mono- and oligo-nucleotidyl-nucleoside - 5' - monophosphoroamides may be represented by the Formulae IV and V respectively

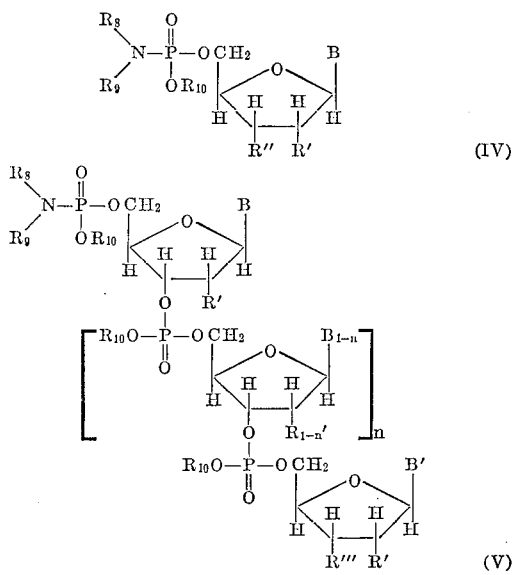

wherein for example $R_8$ and $R_9$, which may be the same or different, represent hydrogen, an alkyl group, e.g. a lower alkyl group such as a methyl, ethyl, propyl or butyl group, a cycloalkyl group e.g. a cyclohexyl group, an aryl group, e.g. a monocyclic aryl group such as a phenyl or tolyl group or a naphthyl group, or an aralkyl group e.g. one in which the alkyl portion is lower alkyl and the aryl portion is monocyclic such as a benzyl group, or together with the nitrogen atom form a heterocyclic group with or without the incorporation of another hetero atom e.g. a morpholinyl, thiazolyl, quinolinyl, piperidyl, pyridyl or imidazolyl group; $R_{10}$ represents hydrogen, or an inorganic or organic cation; $n$ represents zero or an integer from 1 to 5; B, $B_{1-n}$ and B' represent an organic basic group such as purine, pyrimidine, pyridine, imidazole etc., and derivatives thereof; and R', $R_{1-n}$, R'' and R''' which may be the same or different, represent hydrogen or a free or protected hydroxyl group e.g. 2',3'-O-alkylidene or 2',3'-O-arylidine groups when two of R', R'', and R''' are adjacent or an acyloxy group derived from a lower aliphatic carboxylic acid or an aromatic carboxylic acid.

The nucleoside-5'-monophosphoramides and mono- and oligo - nucleotidyl - nucleoside-5'-monophosphoramides used according to this process for the preparation of the corresponding di- or triphosphates include phosphoramide derivatives of:

adenosine-5'-phosphate,
guanosine-5'-phosphate,
uridine-5'-phosphate,
6-mercaptopurine ribonucleoside-5'-phosphate,
5-halogenouridine-5'-phosphate,
cytidine-5'-phosphate,
nicotinamide ribonucleoside-5'-phosphate,
5-amino-4-imidazole carboxamide ribonucleoside-5'-phosphate,
5-amino-4-imidazole carboxamidine ribonucleoside-5'-phosphate,
5-amino-4-cyanoimidazole ribonucleoside-5'-phosphate,
2'-deoxyadenosine-5'-phosphate,
2'-deoxyguanosine-5'-phosphate,
2'-deoxycytidine-5'-phosphate,
2'-deoxyuridine-5'-phosphate,
2'-deoxy-5'-halogenouridine-5'-phosphate,
3-isoadenosine-5'-phosphate,
pseudouridine-5'-phosphate ($\psi$-uridine-5'-phosphate),
thymidylyl-(5'→3')-thymidine-5'-phosphate,
thymidylyl-(5'→3')-2'-deoxyadenosine-5'-phosphate,
2'-deoxycytidylyl-(5'→3')-thymidine-5'-phosphate,
adenylyl-(5'→3')-adenosine-5'-phosphate,
adenylyl-(5'→3')-guanosine-5'-phosphate,
uridylyl-(5'→3')-adenosine-5'-phosphate,
guanylyl-(5'→3')-cytidine-5'-phosphate,
N-acyladenosine-5'-phosphate,
N-acylguanosine-5'-phosphate,
N-acylcytidine-5'-phosphate,
6-azauridine-5'-phosphate,
8-azaguanosine-5'-phosphate,
thymidine-5'-phosphate,
thymidylyl-(5'→3')-thymidylyl-(5'→3')-thymidine-5'-hosphate, etc.

and also the carbohydrate O-protected derivatives thereof.

The amides required for this reaction can be prepared

The amides required for this reaction can be prepared by the treatmnet of a mixture of a nucleoside-5'-monophosphate or mono- or oliogo-nucleotidyl-nucleoside-5'-monophosphate and ammonia or an amine with DCC [J. Amer. Chem. Soc., 80, 3–52 (1958); ibid., 83, 649 (1961)].

However, since organic phosphoric amides are readily hydrolysed by water, it is desirable to keep the reaction mixture and reactants anhydrous. The pyrophosphates for example, may be dried by the azeotropic removal of water with pyridine or dioxan and the pyridine removed with benzene.

The reaction may be carried out in conventional manner and should generally be complete in a period of from several days to a few weeks when cooled or within 3 or 4 days at an ambient temperature.

The process according to the invention can also, if desired, be carried out at an elevated temperature not higher than 100° C. in order to complete the reaction within a shorter period of time. For example, the reaction is complete within 2 or 3 hours at 50° C. and higher temperatures still can be used. It is not necessary to incorporate another solvent into the process because organic triesters of phosphoric acid are themselves capable of acting as useful solvents. However, it is possible to add another solvent as diluent provided it does not have too deleterious an effect upon the reaction. Thus, it is possible to use mixtures of an organic triester of phosphoric acid and a solvent previously used for this reaction e.g. acetonitrile, o-chlorophenol, dimethylformamide, tricresol, dimethylsulphoxide, or mixtures thereof.

The quantity of an organic triester of phosphoric acid used according to this invention is not critical although insufficient can give rise to mechanical difficulties such as insufficient agitation but this can be lessened by the use of a diluent. An excess results in problems of recovery of the solvent. The exact quantity of the organic triester of phosphoric acid which is used may be determined by consideration of these factors.

The continuation of the reaction time beyond completion does not confer any advantageous effect and may cause the decomposition of the desired product.

The reaction products are nucleoside-5'-diphosphates or triphosphates, or mono- or oligonucleotidyl-nucleoside-5'-diphosphates or triphosphates or ester derivatives thereof depending upon the derivatives of ortho- or pyrophosphoric acid used in the reaction.

It is necessary to select the ester derivatives of the 5'-di- or triphosphates which are readily converted into the free 5'-di- or 5'-triphosphates with the mild conditions for example hydrolysis reductive cleavage which do not cleave the P—O—P bond.

Since the ester derivatives are converted into the free 5'-di- or 5'-triphosphates by the ester cleavage reaction, any class of derivatives may be conveniently used for the groups M, $R_4$, $R_5$, $R_6$, $R_7$, $R_8$, R', $R'_{1-n}$, R", and R''' unless those groups interfere with the above reaction.

Since these derivatives are readily converted into the desired products, any class of derivative may be conveniently used for the groups M, $R_4$, $R_5$, $R_6$, $R_7$, $R_8$, $R_9$, R', $R'_{1-n}$, R" and R'''.

The products can be purified by the usual methods such as for example via their insoluble salts e.g. calcium, barium, or mercurous salts, and then converted into either the free acids or into the preferred ammonium or alkali metal salts e.g. lithium or sodium salts, which are soluble.

Alternatively, the reaction mixture, with or without the addition of water, can be treated for example with active charcoal, ion exchange resins, ion exchange cellulose, or ion exchange sephadex to adsorb thereon the -5'-diphosphate or triphosphate contained in the reaction mixture. The desired product may be eluted with a suitable solvent and subsequently converted into a salt.

It is also possible to treat the reaction mixture with ethers, halogenated hydrocarbons, or ketones etc. to give precipitates which can be dissolved in water and treated in a similar manner to that described above.

By the use of the present invention, the amount of nucleoside-5'-diphosphate or triphosphate or mono- or oligo-nucleotidyl-nucleoside-5-di- or triphosphate in the reaction mixture may be sufficiently high to enable one to obtain highly purified-5'-diphosphates or triphosphates by for example the relatively simple techniques of adsorption and elution.

The process of the present invention provides an improved method for the synthesis of nucleoside-5'-diphosphates and triphosphates and mono- and oligo-nucleotidyl-nucleoside-5'-diphosphates and triphosphates which results from the use of organic triesters of phosphoric acid. For example, improved yields of the desired products may be obtained in shorter reaction times which are the result of the stabilizing effect of the aforesaid triesters which also may enable higher reaction temperatures to be used. The invention further provides for a process which in general requires a smaller quantity of solvent than was previously necessary and the amount of ortho- or pyrophosphoric acid or derivatives thereof which are required may likewise be less. This can for example simplify the work-up procedure which is required.

For a better understanding of the invention, the following examples are given by way of illustration only.

SPECIFIC EMBODIMENTS

The following non-limitative examples illustrate the invention.

Example 1

575 mg. (5 mmol) of 85% phosphoric acid was added to pyridine (100 ml.) containing 10 mmol of tri-n-butylamine, and concentrated in vacuo to a syrup which was treated with dry pyridine (50 ml.) and was evaporated. The evaporation procedure was carried out a further 3 or 4 times to dry the product and the remainder of the pyridine was removed with dry benzene to give bis(tri-n-butylammonium) orthophosphate.

690 mg. (1 mmol) uridine-5'-phosphoromorpholidate-4-morpholine - N,N' - dicyclohexyl carboxamidine were added to 5 mmol of bis-(tri-n-butylammonium) orthophosphate and shaken with 50 ml. of triethylphosphate to give a homogeneous solution.

The solution was kept at 50° C. for 3 hours, 50 ml. of water added, and the mixture passed through a column (3 x 45 cm.) packed with 300 ml. of ion exchange resin, [Dowex 2, a commercial product available from Dow Chemical Co., U.S.A.] in its Cl⁻ form. (The proportions of uridine-5'-mono-, and triphosphates in the product were 3.0%, 94% and 2% respectively.) The resin was washed with water until the optical absorption of the washings had disappeared, was washed with aqueous 0.003 N HCl—0.04 M NaCl solution, and then eluted with an aqueous 0.003 N HCl—0.1 M NaCl solution to give 42 ml. of a uridine-5'-diphosphate fraction. (Concentration of uridine-5'-diphosphate was 9.0 mg./ml. as free phosphate. pH 2.0. Uridine-5'-di- and triphosphate were not found.) The eluate was adjusted to pH 3.0 with 10 N caustic soda and was passed at a flow rate of 0.15 ml./min., through a column packed with 10 ml. of highly porous weakly basic anion exchange resin [Duolite A–7 (available from Chemical Process Co., U.S.A.)] in its Cl⁻ form.

The resin was eluted with 1 N NaOH and the eluate adjusted to pH 4.5 with conc. HCl. Methanol was then gradually added to the eluate until the methanol content was about 80% of the total volume. The supernatant was decanted and the residue was centrifuged to give a precipitate of crude uridine-5'-diphosphate. The precipitate was dissolved in 5 ml. of water and reprecipitated with methanol to give 420 mg. of uridine-5'-diphosphate disodium salt ($H_2O$) having a purity greater than 98.5%.

Example 2

A process similar to that described in Example 1 was performed using adenosine-5'-phosphoromorpholidate-4-morpholine-N, N'-dicyclohexyl carboxamidine salt to give ADP-Na salt (2$H_2O$) in 90% yield, and 5% of AMP, 2% of ATP and 3% of starting material respectively were also eluted.

A similar series of processes to that described in Example 1 was performed using nucleoside-5'-phosphoromorpholidates which gave reaction mixtures having the compositions shown in the following table. From the reaction mixtures, nucleoside-5'-diphosphates were isolated in the conventional manner in the yields shown in Table I.

TABLE I

| Nucleoside-5'-monophosphoroamide | Composition of the reaction mixture (percent phosphates) | | | Yield (percent) |
|---|---|---|---|---|
| | Mono- | Di- | Tri- | |
| Uridine-5'-phosphoromorpholidate | 3.0 | 94.0 | 2.0 | 90 |
| Cytidine-5'-phosphoromorpholidate | 5.4 | 89.0 | 5.3 | 85 |
| Thymidine-5'-phosphoromorpholidate | 5.7 | 90 | 4.1 | 87 |
| Nicotinamide-ribonucleoside-5'-phosphoromorpholidate | 6.0 | 92.5 | 1.5 | 90 |
| Guanosine-5'-phosphoromorpholidate | 4.9 | 91.0 | 4.0 | 87 |
| 2'-deoxyadenosine-5'-phosphoromorpholidate | 6.5 | 90.0 | 3.0 | 85 |
| 2'-deoxycytidine-5'phosphoromorpholidate | 8.3 | 87.5 | 3.5 | 82 |
| 6-azauridine-5'-phosphoromorpholidate | 4.9 | 91.5 | 2.1 | 89 |
| 2',3'-O-diacetyladenosine-5'-phosphoromorpholidate | 4.0 | 92.0 | 3.0 | 86 |
| 5-amino-4-imidazolecarboxamide-ribonucleoside-5'-phosphoromorpholidate | 6.0 | 90.0 | 2.5 | 87 |
| 2'-deoxy-3'-O-benzoyladenosine-5'-pyosphoromorpholidate | 5.8 | 92.0 | 2.1 | 86 |
| 2',3'-O-isopropylideneadenosine-5'-phosphoromorpholidate | 3.4 | 93.2 | 2.8 | 88 |

Example 4

544 mg. (1 mmol) of the well dried dicyclohexylguanidine salt of thymidine-5'-phosphoramidate and 2.2 g. (8 mmol) of tri-n-butylammonium orthophosphate were added to a mixture of 10.0 ml. of dimethylsulfoxide and 10 ml. of tributylphosphate, heated at 35–40° C. for 10 hours, and then diluted with 100 ml. of water and passed through a column (3.5 x 45 cm.) of DEAE-cellulose ($HCO_3^-$ form). Linear gradient elution was obtained using 6 l. of 0.4 M acid triethylammonium carbonate and 6 l. of water. The diphosphate fraction was evaporated in vacuo, dissolved in ethanol, and evaporated in vacuo to remove acid carbonate. This treatment was repeated. The residue was dissolved in about 20 ml. of methanol and converted into its sodium salt in the conventional manner using 5 ml. of 1 M NaI acetone solution. 425 mg. of thymidine-5'-diphosphate disodium salt ($2H_2O$) were obtained which had a purity of 97%.

Example 5

370 mg. of well dried thymidine-5'-phosphoroimidazolidate and 2.2 g. of tri-iso-butylammonium orthophosphate were added to 30 ml. of tri-n-propylphosphate, tightly stoppered and stood at room temperature for 3 days. The precipitate was separated and washed with dimethylformamide. The filtrate was mixed with an equal volume of methanol and was evaporated in vacuo to dryness. 50 ml. of water were added to the residue which was passed through a DEAE-cellulose column (4 x 50 cm.) and treated in a similar manner to that described in Example 4 to give 400 mg. of thymidine-5'-diphosphate disodium salt ($2H_2O$) having a purity of 97.5%.

Example 6

570 mg. of the well dried dicyclohexylguanidine salt of 3-β-D-ribofuranosyladenine-5'-phosphoroamidate (3-isoadenosine-5'-phosphoroamide) and 3.2 g. of well dried bis-(tri-n-butylammonium) orthosphosphate were added to 20 ml. of trimethylphosphate and stood at room temperature for 4 days. The mixture was added to 50 ml. of water and extracted 3 times with 50 ml. of ether. The aqueous solution was adjusted to pH 8 with aqueous ammonia and was passed through a column (2.5 x 30 cm.) containing Dowex 2–X8 resin [trademark of the resin available from Dow Chemical Co., U.S.A.] in its Cl⁻ form. The resin was washed with water, and a small quantity of a monophosphate fraction was eluted with a mixture of 0.003 N HCl—0.01 N LiCl solutions. The 5'-diphosphate fraction was eluted with 0.003 N HCl—0.05 N LiCl. About 2 liters of the fraction containing the 5'-diphosphate were neutralized with LiOH and concentrated to about 20 ml. in vacuo at a temperature below 30° C. The addition of acetone (200 ml.) gave a precipitate which was added to 40 ml. of methanol, 300 ml. of acetone were added and the resulting precipitate was centrifuged. The precipitate was well dried in vacuo at 50° C. to yield 425 mg. of 3-β-D-ribofuranosyladenine-5'-diphosphate dilithium salt ($2H_2O$).

Example 7

A process similar to that described in Example 4 was carried out using 974 mg. of well dried 2'-deoxycytidyl-(5'→3')-deoxyadenylyl-(5'→3')-thymidine-5' - phosphoroimidazolidate, 2.8 of bis-(triethylammonium) orthophosphate and 50 ml. of triethylphosphate to yield 920 mg. of 2'-deoxycytidyl-(5'→3')-thimidine-5'-diphosphate disodium salt ($3H_2O$).

Example 8

0.57 g. of the well dried dicyclohexylguanidine salt of adenosine-5'-phosphoroamidate and 3.0 g. of bis-(tri-n-propylammonium) orthophosphate were added to 30 ml. of tricyclohexylphosphate, stirred at 0° C. until the phosphoramide had disappeared and stood for 4 days. The mixture was added to 50 ml. of water and extracted 3 times with 50 ml. of ether. The aqueous layer was treated with active carbon to adsorb the desired product. Elution with 50% ethanolic ammonia solution, evaporation of the elute to dryness in vacuo with cooling, and treatment with 50 ml. of water gave a solution which was passed through a column packed with 30 ml. of Dowex-2 ion exchange resin in its Cl⁻ form. 450 mg. of adenosine-5'-diphosphate disodium salt ($2H_2O$) having a purity of 98.5% was obtained by a smiliar method to that used in Example 1.

Example 9

0.55 g. of the well dried dicyclohexylguanidine salt of 2'-deoxycytidine-5'-phosphoroamidate and 1.7 g. of dibenzylorthophosphate were added to 20 ml. of tribenzylphosphate and heated at 50° C. for 3 hours. The reaction mixture was added to 50 ml. of water and extracted 5 times with 50 ml. of ether. The aqueous layer was evaporated in vacuo to remove ether. The solution was reduced with hydrogen gas using palladium on charcoal as catalyst. The catalyst was filtered off, washed with 50% ethanol containing ammonia, and the filtrate and washings were combined and concentrated in vacuo. 420 mg. of 2'-deoxycytidine-5'-diphosphate sodium salt ($H_2O$) were obtained by the treatment in a similar manner to that described in Example 4.

Example 10

0.45 g. of well dried cyclohexylamine salt of adenosine-5'-phosphoroamidate ad 2.5 g. of bis(tribenzylammonium) orthophosphate were added to 50 ml. of tri-O-tolylphosphate and treated in a similar manner to that described in Example 8 to yield 400 mg. of adenosine-5'-diphosphate sodium salt ($2H_2O$).

Example 11

310 mg. of the well dried dicyclohexylguanidine salt of pseudourisine-5'-phosphoroamidate and 1.5 g. of bis-(tri-n-propylammonium) orthophosphate were added to 80 ml. of trihexylphosphate and treated in a similar manner to that described in Example 4 to yield 220 mg. of pseudouridine-5'-diphosphate sodium salt.

Example 12

0.67 g. of well dried thymidyl-(5'→3') thymidine-5'-phosphoroimidazolidate and 2.8 g. of bis(trihexylammonium) orthophosphate were added to 50 ml. of triethylphosphate and treated in a similar manner to that described in Example 4 to give 580 mg. of thymidyl-(5'→3')-thymidine-5'-diphosphate sodium salt.

Example 13

2.23 g. (5 mmol) of tetrasodiumpyrophosphate ($10H_2O$) were dissolved in water (100 ml.) and passed through 100 ml. of the ion exchange resin, Dowex 50–W [commercial product available from Dow Chemical Co., U.S.A.] in its H⁺ form. The resin was washed with water (200 ml.), the washings and effluent were combined, and the solution added to pyridine (500 ml.) containing 10 mmol of tri-n-butylamine. Concentration of this solution in vacuo gave a syrup which was added to dry puridine (100 ml.) and was evaporated. Additional dehydration treatments were carried out 3 or 4 more times and the remainder of the pyridine was removed with dry benzene to yield bis-(tri-n-butylammonium) pyrophosphate. Uridine-5'-phosphoromorpholidate-4 - morpholine - N,N' - dicyclohexyl carboamidine was prepared by the method reported in J. Am. Chem. Soc., 83, 655 (1961) and dried in vacuo at 100° C. for 3 hours over $P_2O_5$. 690 mg. (1 mmol) of this product were added to 5 mmol of bis-(tri-n-butylammonium) pyrophosphate, and the mixture added to 50 ml. of triethylphosphate and shaken to give a homogeneous solution.

The solution was kept at 50° C. for 3 hours, added to 50 ml. of water, and passed through a column 3 x 45 cm.) packed with 300 ml. of ion exchange resin [Dowex 2, commercial product available from Dow Chemical Co., U.S.A.] in its Cl⁻ form. The resin was washed with water until the optical absorption of the washings disappeared, and then eluted by the linear gradient method, using 10 liters of 0.003 N HCl in the mixing vessel and 10 liters of a mixed solution of 0.4 N LiCl and 0.03 N HCl in the supplementary vessel. Each 50 ml. fraction was collected and the optical absorption of the solution at 260 m$\mu$ determined. At first, uridine-5'-phosphate (UMP) (2.19%), was obtained followed by uridine-5'-diphosphate (UDP) (5.90%) and finally by uridine-5'-triphosphate (UTP) (92.0%). The UTP fraction was adjusted with LiOH to pH 7.5, evaporated to dryness, added to 50 ml. of methanol, shaken well, and treated with 500 ml. of acetone. A white precipitate was obtained by centrifuging and a similar treatment was repeated a further two times to remove LiCl. Drying at room temperature over $P_2O_5$, 505 mg. of uridine-5'-triphosphate lithium salt ($2H_2O$) were obtained in 90% yield and a purity of 98%. The Rf value on paper chromatography, UV and IR spectra were observed to be similar to those of a standard specimen.

A series of reactions was carried out under different conditions to give the results shown in Table II.

TABLE II

| Solvent | Temp. (° C.) | Time (hrs.) | Yield of phosphates percent | | |
|---|---|---|---|---|---|
| | | | Mono- | Di- | Tri- |
| Pyridine | −10 | 84 | 47.6 | 16.0 | 36.0 |
| Pyridine-acetonitrile | −10 | 84 | 41.25 | 22.2 | 36.6 |
| | −10 | 84 | 46.6 | 16.0 | 36.0 |
| Pyridine | −25 | 48 | 11.7 | 68.0 | 20.2 |
| | 0 | 192 | 16.59 | 36.4 | 47.15 |
| DMSO | 20 | 96 | 16.5 | 6.68 | 77.0 |
| Triethylphosphate | 20 | 96 | 2.61 | 5.0 | 92.3 |
| DMSO plus triethylphosphate (1:1) | 20 | 96 | 6.37 | 13.6 | 80.1 |
| Triethylphosphate | 50 | 3 | 2.19 | 5.90 | 92.0 |
| Triethylphosphate | 50 | 1 | 9.53 | 3.93 | 86.7 |

Example 14

A similar process to that described in Example 13 was carried out using adenosine-5'-phosphoromorpholidate-4-morpholine-N,N'-dicyclohexyl carboxamidene salt to give ATP-Li salt in 91% yield having a purity of 97% and elution also gave 0.8% of AMP and 4% of ADP.

Example 15

A similar process to that described in Example 13 was performed using nucleoside-5'-phosphoromorpholidate to give reaction mixtures having the compositions shown in Table III. From the reaction mixtures nucleoside-5'-triphosphates were isolated by the usual methods in the yields shown in Table III.

TABLE III

| Nucleoside-5'-monophosphoroamide | Composition of the reaction mixture (percent phosphates) | | | Yield (percent) |
|---|---|---|---|---|
| | Mono- | Di- | Tri- | |
| Uridine-5'-phosphoromorpholidate | 2.19 | 5.90 | 92.0 | 90 |
| Cytidine-5'-phosphoromorpholidate | 1.5 | 6.0 | 92.5 | 89 |
| Thymidine-5'-phosphoromorpholidate | 2.2 | 5.4 | 92.0 | 90 |
| Nicotinamide-ribonucleoside-5'-phosphoromorpholidate | 1.9 | 5.5 | 92.6 | 91 |
| Guanosine-5'-phosphoromorpholidate | 1.5 | 6.0 | 92.5 | 90 |
| 2'-deoxyadenosine-5'-phosphoromorpholidate | 3.0 | 6.5 | 90.0 | 85 |
| 2'-deoxycytidine-5'-phosphoromorpholidate | 2.0 | 4.7 | 92.3 | 89 |
| 6-azauridine-5'-phosphoromorpholidate | 2.1 | 4.9 | 91.9 | 89 |
| 2',3'-O-diacetyladeonsine-5'-phosphoromorpholidate | 2.0 | 5.3 | 92.5 | 86 |
| 5-amino-4-imidazole carboxamide-ribonucleoside-5'-phosphoromorpholidate | 2.3 | 5.6 | 91.9 | 88 |
| 2'-deoxy-3'-O-benzoyladenosine-5'-phosphoromorpholidate | 2.2 | 5.7 | 91.8 | 87 |

Example 16

544 mg. (1 mmol) of the well dried dicyclohexylguanidine salt of thymidine-5'-phosphoroamidate and 1.45 g. (4 mmol) of tributylammonium pyrophosphate were added to a mixture of 10.0 ml. of dimethylsulfoxide and 20.0 ml. of tributylphosphate, left at room temperature for 2-3 days, diluted with 120 ml. of water and passed through a column (3.5 x 45 cm.) of DEAE-cellulose ($HCO_3^-$ form). Linear gradient elution was achieved by using 6 l. of 0.4 M triethylammonium bicarbonate and 6 l. of water. The triphosphate fraction was evaporated in vacuo to dryness, dissolved in methanol, and evaporated to remove acid carbonate. A similar treatment was repeated 4 times. The residue was dissolved in about 20 ml. of methanol and converted into its sodium salt in the usual way by using 5 ml. of 1 M NaI in acetone solution. 540 mg. of thymidine-5'-triphosphate tetrasodium salt ($2H_2O$) were obtained having a purity of 97%.

Example 17

370 mg. of well dried thymidine-5'-phosphoroimidazolidate [prepared by a similar method to that described in J. Am. Chem. Soc., 87, 1785 (1965)] and 1.28 g. of tributylammonium pyrophosphate [prepared by a similar method to that described in J. Am. Chem. Soc., 87, 1785 (1965)] were added to 20 ml. of tri-n-propylphosphate, tightly stoppered, and left for 2 days. The precipitate was separated and washed with dimethylformamide. The filtrate was added to an equal volume of methanol and evaporated in vacuo to dryness. The residue dissolved with a small amount of water and was passed through a DEAE-cellulose column (4 x 50 cm.) and eluted by the linear-gradient technique using 10 l. of 0.4 M aqueous triethylammonium hydrogen carbonate solution. The triphosphate fraction was evaporated in vacuo to dryness, treated with ethanol, and evaporated to remove the excess of triethylammonium hydrogen carbonate. The residue was dissolved in methanol to give an approximately 0.05 M triphosphate methanolic solution, and treated with five times its volume of a 0.15 M solution of sodium perchlorate in acetone. The precipitated sodium salt was separated, washed 4 times with 1 ml. of acetone and dried in vacuo over $P_2O_5$ to give 490 mg. of thymidine-5'-triphosphate trisodium salt ($H_2O$) of 98% purity.

Example 18

A process similar to that described in Example 17 was performed using 974 mg. of well dried 2'-deoxycytidyl-(5'→3')-deoxyadenylyl-(5'→3')-thymidine-5' - phosphorimidazolidate, 1.52 g. of well dried bis(triethylammonium) pyrophosphate and 50 ml. of triethylphosphate to yield 1.1 g. of 2'-deoxycytidyl-(5'→3')-deoxyadenylyl-(5'→3')-thymidine-5'-triphosphate hexasodium salt ($8H_2O$).

Example 19

500 mg. of the well dried dicyclohexylguanidine salt of 3-β-D-ribofuranosyladenine-5'-phosphoroamidate-(3 - isoadenosine-5'-phosphoramide) and 1.25 g. of well dried tributylammonium pyrophosphate were added to 15 ml. of trimethylphosphate and stirred at room temperature for 3-4 days. The mixture was added to 50 ml. of water and extracted 3 times with 50 ml. of ether. The aqueous solution was adjusted to pH 8 with aqueous ammonia and passed through a column (2.5 x 30 cm.) of Dowex 1–X 8 resin [trademark of the resin available from Dow Chemical Co., U.S.A.] in its $Cl^-$ form. The resin was washed with water. A small quantity of a monophosphate fraction and a diphosphate fraction were eluted with 2 l. of a mixed solution of 0.005 N HCl—0.05 N LiCl. A 5'-triphosphate fraction was eluted with 0.005 N HCl—0.1 N LiCl. About 1.5–2 litres of the fraction containing 5'-triphosphate were neutralized with LiOH and evaporated to dryness in vacuo. A precipitate was obtained by the addition of methanol (80 ml.) and the subsequent addition of acetone (600 ml.), and this was dried in vacuo at 100° C. to yield 391 mg. of 3-β-D-ribofuranosyladenine-5'-triphosphate tetralithium salt.

Example 20

0.57 g. of the well dried dicyclohexylguanidine salt of adenosine-5'-phosphoroamidate and 2.0 g. of bis-(tri-n-propylammonium) pyrophosphate were added to 20 ml. of tricyclohexylphosphate and stirred at 0° C. until the phosphoramide was disappeared (yield of 5'-triphosphate . . . 90.2%).

The mixture was added to 50 ml. of water and extracted 3 times with 50 ml. of ether. The aqueous layer was treated with active charcoal to adsorb the desired product. Elution with 50% ethanol containing ammonia, evaporation of the eluate to dryness in vacuo and dilution with water to 50 ml. gave a solution which was adjusted to pH 2.5 with HCl and passed through a column (0.6 x 10 cm.)

packed with 3 ml. of a conventional ion exchange resin until the adsorption of the triphosphate on the resin was saturated. The 5'-triphosphate, which passed through the column without being adsorbed, was recovered by using another similar resin column.

The resin saturated with 5'-triphosphate was eluted with 1 N NaOH, the 5'-triphosphate fractions were combined and treated with acetone to give a precipitate of the 5'-triphosphate. The precipitate was washed with water and dried in vacuo to give 0.585 g. of adenosine-5'-triphosphate trisodium salt (6.H$_2$O) having a purity of 97%.

Example 21

0.5 g. of the well dried dicyclohexylguanidine salt of 2'-deoxycytidine-5'-phosphoroamidate and 1.7 g. of tribenzylpyrophosphate were added to 15 ml. of tribenzylphosphate and heated at 50° C. for 3 hours. The reaction mixture was added to 50 ml. of water and extracted 5 times with 50 ml. of ether. The aqueous layer was evaporated in vacuo to remove ether. The solution was then hydrogenated for 3 hours in an atmosphere of hydrogen oven palladium on charcoal catalyst. The catalyst was filtered off, washed with 50% ethanol containing ammonia, and the filtrate and washings were combined and concentrated in vacuo. 0.48 g. of 2'-deoxycytidine-5'-triphosphate tetra-sodium salt (2H$_2$O) were isolated by the method described in Example 17.

Example 22

0.45 g. of well dried cyclohexylamine salt of adenosine-5'-phosphoramide and 2.5 g. of bis-(tribenzylammonium) pyrophosphate were added to 50 ml. of tri-o-tolylphosphate and treated in a similar manner to that described in Example 20 to yield 0.59 g. of adenosine-5'-triphosphate triphosphate trisodium salt (6H$_2$O).

Example 23

310 mg. of the well dried dicyclohexylguanidine salt of pseudouridine-5'-phosphoroamidate and 1.1 g. of bis-(tri-n-propylammonium) pyrophosphate were added to 20 ml. of trihexylphosphate and treated in a similar manner to that described in Example 16 to yield 290 mg. of pseudouridine-5'-triphosphate tetrasodium salt (2H$_2$O).

Example 24

0.67 g. of well dried thymidyl-(5'→3') thymidine-5'-phosphoroimidazolidate and 2.5 g. of bis-(trihexylammonium)pyrophosphate were added to 50 ml. of triethylphosphate and treated in a similar manner to that described in Example 17 to give 0.85 g. of thymidyl-(5'→3')-thymidine - 5' - triphosphate pentasodium salt (7H$_2$O).

We claim:
1. A process for the preparation of nucleoside-5'-diphosphates and triphosphates and mono- and oligo-nucleotidyl-nucleoside-5'-diphosphates and triphosphates, consisting of reacting in the presence of an organic triester of phosphoric acid of the formula

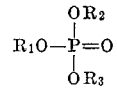

in which each of $R_1$, $R_2$ and $R_3$ is a member selected from the group consisting of lower alkyl, cycloalkyl, monocyclic aryl, and monocyclic aryl lower alkyl, a monophosphoramide selected from the group consisting of a nucleoside-5'-phosphoramide, a mono-nucleotidyl-nucleoside-5'-phosphoramide and an oligo-nucleotidyl-nucleoside-5'-phosphoramide with a member selected from the group consisting of a compound of the formula

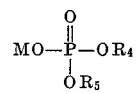

and a compound of the formula

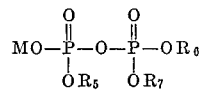

wherein M is a cation and $R_4$, $R_5$, $R_6$ and $R_7$ are each a member selected from the group consisting of a cation, lower alkyl, cycloalkyl, monocyclic aryl and monocyclic aryl lower alkyl.

2. A process as claimed in claim 1 in which the monophosphoramide is a compound selected from the group consisting of a compound of the formula

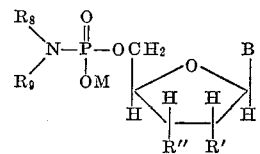

and a compound of the formula

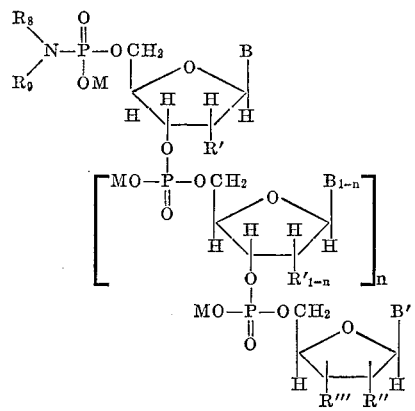

in which $R_8$ and $R_9$ are each hydrogen, lower alkyl, cycloalkyl, monocyclic aryl, naphthyl or monocyclic aryl lower alkyl or together with the adjacent nitrogen atom are morpholinyl, thiazolyl, quinolinyl, piperidyl, pyridyl or imidazolyl; M is a cation; $n$ represents zero or an integer from 1 to 5; R', $R'_{1-n}$, R" and R''' are each hydrogen, hydroxy, acyloxy in which the acyl radical is derived from a lower aliphatic carboxylic acid or two of R', R" or R''' on adjacent carbon atoms together form a 2', 3'-O- alkylidene group or a 2',3'-O-arylidene group; and B, $B_{1-n}$, and B' are each a purine, pyrimidine, pyridine or imidazole group.

3. A process as claimed in claim 1 in which the organic triester of phosphoric acid has the formula

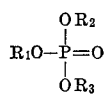

in which $R_1$, $R_2$ and $R_3$ are each lower alkyl.

4. A process as claimed in claim 1 in which the cations of the compounds

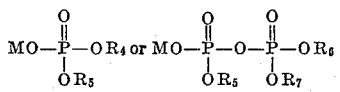

are trimethylammonium, triethylammonium, tripropylammonium, tributylammonium, trihexylammonium, tribenzylammonium, triphenylammonium, tricyclohexylammonium, piperidinium, cyclohexylguanidinium, 4-morpholino-N,N'-dicyclohexylcarboxamidinium, lithium, sodium or potassium ions.

5. A process as claimed in claim 1 in which the reaction is carried out between ambient temperature and an elevated temperature not higher than 100° C.

6. A process as claimed in claim 1 in which the monophosphoramide is selected from the group consisting of a ribonucleoside-5'-phosphoramide, a mono-ribonucleotidyl-ribonucleoside - 5' - phosphoramide and and an oligo-ribonucleotidyl-ribonucleoside-5'-phosphoramide.

References Cited

UNITED STATES PATENTS

| 3,299,043 | 1/1967 | Schramm et al. | 260—211.5 |
| 3,347,846 | 10/1967 | Yoshikawa et al | 260—211.5 |
| 3,413,282 | 11/1968 | Yoshikawa et al. | 260—211.5 |

OTHER REFERENCES

Moffatt et al. "Jour. Amer. Chem. Soc.," vol. 83, 1961, pp. 649–658.

LEWIS GOTTS, Primary Examiner

J. R. BROWN, Assistant Examiner